(12) United States Patent
Raiu

(10) Patent No.: US 11,366,902 B2
(45) Date of Patent: Jun. 21, 2022

(54) SYSTEM AND METHOD OF DETECTING MALICIOUS FILES BASED ON FILE FRAGMENTS

(71) Applicant: AO Kaspersky Lab, Moscow (RU)

(72) Inventor: Costin Raiu, Moscow (RU)

(73) Assignee: AO Kaspersky Lab, Moscow (RU)

( * ) Notice: Subject to any disclaimer, the term of this patent is extended or adjusted under 35 U.S.C. 154(b) by 258 days.

(21) Appl. No.: 16/580,015

(22) Filed: Sep. 24, 2019

(65) Prior Publication Data
US 2021/0019407 A1   Jan. 21, 2021

(30) Foreign Application Priority Data

Jul. 17, 2019 (RU) ............................ RU2019122428

(51) Int. Cl.
*G06F 21/56* (2013.01)
*G06F 21/57* (2013.01)

(52) U.S. Cl.
CPC .......... *G06F 21/564* (2013.01); *G06F 21/565* (2013.01); *G06F 21/57* (2013.01)

(58) Field of Classification Search
None
See application file for complete search history.

(56) References Cited

U.S. PATENT DOCUMENTS

| | | | | |
|---|---|---|---|---|
| 7,478,431 B1* | 1/2009 | Nachenberg | .......... | G06F 21/565 713/175 |
| 8,302,193 B1* | 10/2012 | Gardner | .................. | G06F 21/56 726/24 |
| 9,135,442 B1* | 9/2015 | Kennedy | ................ | G06F 21/563 |
| 9,292,689 B1* | 3/2016 | Chuo | ..................... | G06F 21/562 |
| 9,349,002 B1* | 5/2016 | Zhang | .................... | G06F 21/564 |
| 9,576,131 B2* | 2/2017 | Tuvell | ................... | H04L 63/1441 |
| 10,484,419 B1* | 11/2019 | Davis | ..................... | G06F 21/577 |

(Continued)

FOREIGN PATENT DOCUMENTS

CN         106878240 B   *   6/2020

OTHER PUBLICATIONS

Momina Tabish et al. "Malware Detection using Statistical Analysis of Byte-Level File Content" Cybersecurity and Inteligence Informatics, Jun. 28, 2009, pp. 23-31.

*Primary Examiner* — Michael Pyzocha
(74) *Attorney, Agent, or Firm* — ArentFox Schiff LLP; Michael Fainberg

(57) ABSTRACT

Disclosed herein are systems and methods for detecting malicious files based on file fragments. In one aspect, an exemplary method comprises, extracting data fragments from a file, for each extracted data fragment, determining a category selected from a list of categories that includes at least: trusted, malicious, and untrusted, when a number of data fragments categorized as being malicious is below a predetermined threshold, avoiding categorization of the file as malicious, and when a number of data fragments categorized as being malicious reaches or exceeds the predetermined threshold, determining whether at least one malicious file detection rule having criteria for detecting a malicious file is found, when at least one malicious file detection rule whose criteria is met is found, categorizing the file as a malicious file, and when no malicious file detection rule whose criteria is met is found, avoiding categorization of the file as a malicious file.

12 Claims, 4 Drawing Sheets

(56) References Cited

U.S. PATENT DOCUMENTS

| | | | |
|---|---|---|---|
| 2007/0240222 A1* | 10/2007 | Tuvell | G06F 16/245 |
| | | | 726/24 |
| 2008/0263669 A1 | 10/2008 | Alme | |
| 2012/0023578 A1* | 1/2012 | Warren | H04L 63/1416 |
| | | | 726/22 |
| 2012/0151586 A1* | 6/2012 | Hentunen | G06F 21/563 |
| | | | 726/24 |
| 2013/0145471 A1* | 6/2013 | Richard | G06F 21/562 |
| | | | 726/24 |
| 2013/0198841 A1* | 8/2013 | Poulson | G06F 21/51 |
| | | | 726/23 |
| 2014/0150105 A1* | 5/2014 | Yu | G06F 21/562 |
| | | | 726/24 |
| 2015/0317479 A1* | 11/2015 | Jiang | G06F 21/56 |
| | | | 726/23 |
| 2016/0094564 A1 | 3/2016 | Mohandas et al. | |
| 2017/0085585 A1* | 3/2017 | Morkovsk | G06F 21/316 |
| 2018/0101682 A1* | 4/2018 | Krukov | G06F 21/565 |
| 2018/0124070 A1* | 5/2018 | Kailash | G06F 21/56 |
| 2018/0285565 A1 | 10/2018 | Konopisky | |
| 2018/0288072 A1* | 10/2018 | Lipkey | H04L 9/0643 |
| 2019/0108338 A1 | 4/2019 | Saxe et al. | |
| 2019/0114419 A1 | 4/2019 | Chistyakov | |
| 2019/0132334 A1* | 5/2019 | Johns | G06N 3/04 |
| 2019/0228151 A1* | 7/2019 | Schmugar | H04L 63/1416 |
| 2020/0257799 A1* | 8/2020 | Saxe | G06F 21/563 |

\* cited by examiner

```
55          push    ebp
8B EC       mov     ebp, esp
83 EC 14    sub     esp, 14h
56          push    esi              ; lps/StructType
57          push    edi              ; dwCertEncodingType
68 00 00 00 F0  push  0F0000000h     ; dwFlags
33 FF       xor     edi, edi
6A          push
```

SYSTEM AND METHOD OF DETECTING MALICIOUS FILES BASED ON FILE FRAGMENTS

CROSS REFERENCE TO RELATED APPLICATIONS

The present application claims priority to Russian Patent Application No. 2019122428, filed on Jul. 17, 2019, the entire content of which is incorporated herein by reference.

FIELD OF TECHNOLOGY

The present disclosure relates to the field of protection of information, more specifically, to systems and methods of detecting malicious files based on file fragments.

BACKGROUND

The large number of malicious files appear each day—thereby stimulating the development of antivirus technologies. Antivirus programs are using increasingly more complex technologies for adequate protection of computing devices. However, at the same time, cyber criminals are also developing new approaches to create malicious software, especially executable files. Cyber criminals are resorting to newer and more sophisticated techniques for hiding the presence of a malicious software on the computing device. Indeed these techniques are impeding the analysis of such malicious software.

Special care is devoted to the use of the aforementioned techniques when developing antivirus software to be used for detecting targeted attacks (sometimes called advanced persistent threats, APTs). The malicious software that launch targeted attacks, especially obfuscated files, are difficult to analyze and combat using classification models included in antivirus software.

Thus, there is a need for a more optimal way to detect malicious files.

SUMMARY

Aspects of the disclosure relate to the field of information security, more specifically to systems and methods for detecting malicious files based on file fragments.

In one exemplary aspect, a method for detecting malicious files based on file fragments is implemented in a computer comprising a hardware processor, the method comprising: extracting data fragments from a file, for each data fragment extracted from the file, determining a category, wherein the category is selected from a list of categories that includes at least: trusted, malicious, and untrusted, when a number of data fragments of the file categorized as being malicious is below a predetermined threshold, avoiding categorization of the file as malicious, and when a number of data fragments of the file categorized as being malicious reaches or exceeds the predetermined threshold, determining whether at least one malicious file detection rule having criteria for detecting a malicious file is found, when at least one malicious file detection rule whose criteria is met is found, categorizing the file as a malicious file, and when no malicious file detection rule whose criteria is met is found, avoiding categorization of the file as a malicious file.

According to one aspect of the disclosure, a system is provided for detecting malicious files based on file fragments, the system comprising a hardware processor configured to: extract data fragments from a file, for each data fragment extracted from the file, determine a category, wherein the category is selected from a list of categories that includes at least: trusted, malicious, and untrusted, when a number of data fragments of the file categorized as being malicious is below a predetermined threshold, avoid categorization of the file as malicious, and when a number of data fragments of the file categorized as being malicious reaches or exceeds the predetermined threshold, determine whether at least one malicious file detection rule having criteria for detecting a malicious file is found, when at least one malicious file detection rule whose criteria is met is found, categorize the file as a malicious file, and when no malicious file detection rule whose criteria is met is found, avoid categorization of the file as a malicious file.

In one exemplary aspect, a non-transitory computer-readable medium is provided storing a set of instructions thereon for detecting malicious files based on file fragments, wherein the set of instructions comprises instructions for: extracting data fragments from a file, for each data fragment extracted from the file, determining a category, wherein the category is selected from a list of categories that includes at least: trusted, malicious, and untrusted, when a number of data fragments of the file categorized as being malicious is below a predetermined threshold, avoiding categorization of the file as malicious, and when a number of data fragments of the file categorized as being malicious reaches or exceeds the predetermined threshold, determining whether at least one malicious file detection rule having criteria for detecting a malicious file is found, when at least one malicious file detection rule whose criteria is met is found, categorizing the file as a malicious file, and when no malicious file detection rule whose criteria is met is found, avoiding categorization of the file as a malicious file.

In one aspect, the method further comprises, when all of the data fragments of the file are categorized as being trusted, categorizing the file as being a trusted file.

In one aspect, the category of the data fragment is determined by searching in a database of data fragments, the database comprising at least one of: a list of data fragments, identifiers of categories of the data fragments included in the list of data fragments, and byte sequences containing substitute characters, wherein a given byte sequence coincides with the data fragment, when during a comparison of the data fragment with the given byte sequence, the substitute character coincides with any value.

In one aspect, when the search in the database is unsuccessful, the category of the data fragment is determined as being untrusted, and when the search is successful, the category of the data fragment is determined as being either malicious or trusted based on a content of an identifier of the category of the data fragment included in the database.

In one aspect, the at least one malicious file detection rule includes: a malicious file detection rule for detecting the file as being malicious when the number of data fragments of the file categorized as being malicious reaches or exceeds the predetermined threshold, the predetermined threshold being expressed either as a percentage of the data fragments of the file being detected as being malicious or as a number of data fragments of the file being detected as malicious.

In one aspect, the at least one malicious file detection rule includes: a malicious file detection rule based on a harmfulness rating of the file.

In one aspect, the file is categorized as malicious when the harmfulness rating of the file reaches or exceeds a predetermined threshold of harmfulness, the harmfulness rating of the file being computed as a sum of harmfulness ratings of all data fragments of the file that are categorized as being malicious.

In one aspect, the method of the present disclosure detects malicious files based on file fragments. The method is designed to improve the computer security. Thus, the method of the present disclosure advantageously enables information security of the data.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3 illustrates an exemplary extracted fragment that can be presented as a sequence of instructions.

DETAILED DESCRIPTION

Figure 1:
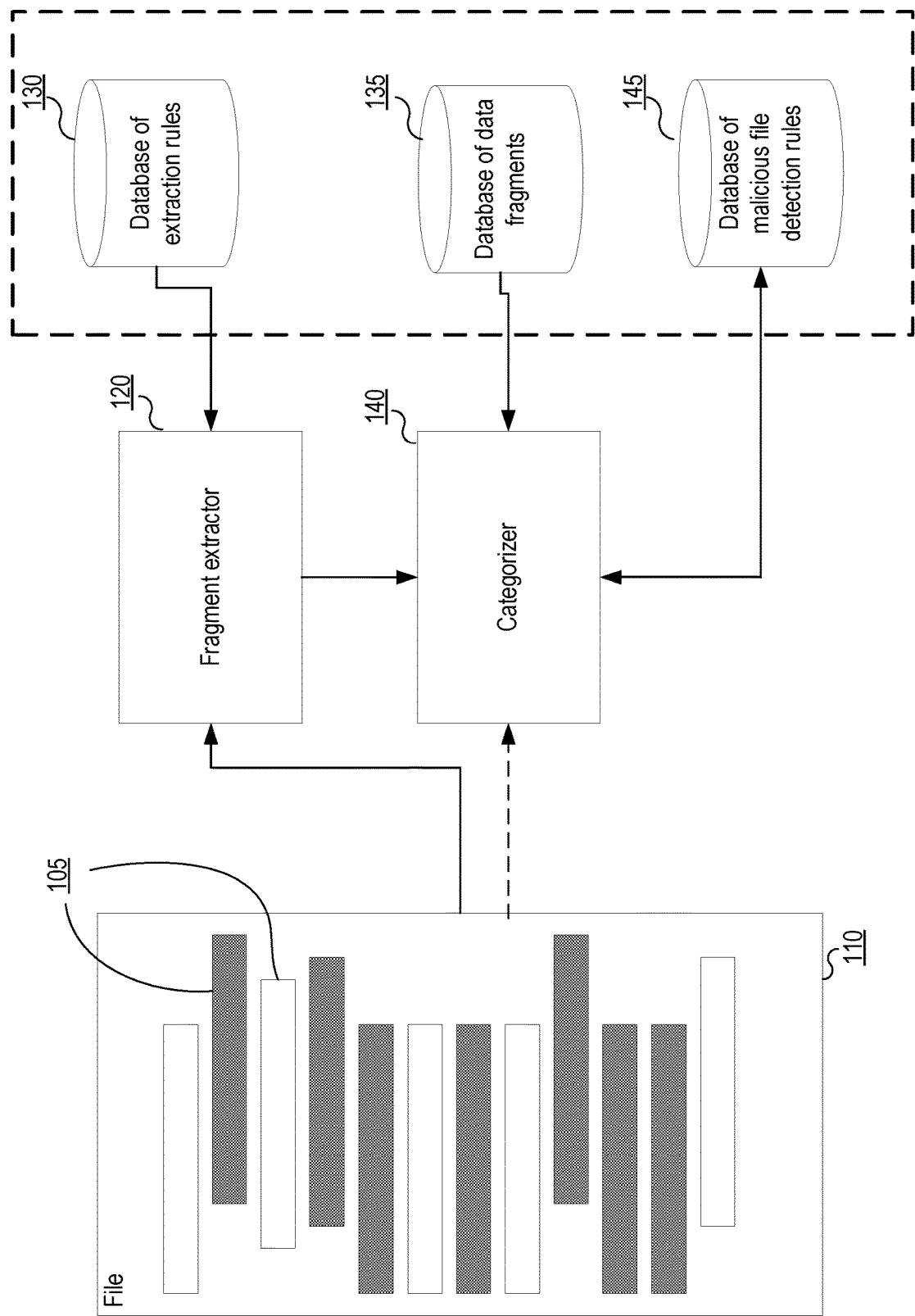
FIG. 1 illustrates an example diagram of a system for detecting malicious files based on file fragments in accordance with aspect of the present disclosure.

Exemplary aspects are described herein in the context of a system, method, and a computer program for detecting malicious files based on file fragments. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, a number of terms and concepts, as used in describing various aspects of the disclosure, are defined herein.

A malicious application is an application able to cause harm to a computing system or to the data of a user of the computing system (in other words, a computer, a group of computers, personal computer, server, mobile telephone, and so forth), such as: an Internet worm, a keyboard logger, a computer virus. The harm caused may be unlawful access to the resources of the computer, including the data being kept on the computer, for the purpose of theft, as well as unlawful use of the resources, including for storage of data, performing computations, and so on.

A trusted application is an application which does not cause harm to a computing system or to a user of the computing system. A trusted application may comprise an application which has been developed by a trusted software manufacturer, downloaded from a trusted source (such as a site listed in a database of trusted sites), or an application whose identifier (or other data by which the application can be uniquely identified, for example, the hash value of the file of the application) is kept in a database of trusted applications. The identifier of the manufacturer, such as a digital certificate, may also be kept in the database of trusted applications.

An untrusted application is an application which is not trusted, but also is an application that is not categorized as being harmful, for example, with the aid of an antivirus application. Furthermore, an untrusted application may afterwards be categorized as malicious, for example, with the aid of an antivirus scan.

A malicious file is a file which is a component of a malicious application, and contains a program code (e.g., an executable or interpretive code).

An untrusted file is a file which is a component of an untrusted application, and contains a program code (e.g., an executable or interpretive code).

A trusted file is a file which is a component of a trusted application.

In one aspect, a predetermined list of application categories includes at least: a category of trusted applications, a category of untrusted applications, and a category of malicious applications.

A data fragment (or simply a "fragment") is a continuous sequence of bytes of a fixed length.

A data fragment of a file is a data fragment contained in a file. A data fragment of a file may belong to one of the categories: trusted, malicious, and untrusted.

In one aspect, a data fragment belongs to the trusted category when the data fragment is encountered only in trusted files.

In one aspect, a data fragment belongs to the malicious category when the data fragment is encountered only in malicious files.

In one aspect, whether a data fragment is present in a file of a certain category is determined by searching, in a database of data fragments, for the corresponding (appropriate) information about the data fragment, wherein the information about the data fragment contains a byte sequence of the file, where one or more bytes of the byte sequence may be replaced by substitute characters (e.g., wildcard characters). Such byte sequences may also be referred to as a mask of the data fragment, wherein each mask in the database of data fragments is labeled by an identifier of the data fragment category. Furthermore, extracting a data fragment does not require decompiling the file.

A rule for extracting a data fragment is defined as a rule that contains requirements for extracting a data fragment, e.g., from a file. If the data fragment meets all the requirements of the rule, the data fragment satisfies the given rule for extracting fragments. The use of a rule for extracting data fragments from a file enables the extraction from the file only those data fragments which meet the requirements of the rule.

In one aspect, the present disclosure describes a system for detecting malicious files that is implemented on a computing system (e.g., a server, computer, etc.), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 4). Furthermore, the system components may be realized either within a single computing device or spread out among several interconnected computing devices.

FIG. 1 illustrates an example diagram of a system 100 for detecting malicious files based on file fragments in accordance with aspect of the present disclosure.

The system 100 for detecting malicious files comprises a fragment extractor 120 and categorizer 140. In one aspect, the fragment extractor 120 and categorizer 140 are situated on a single computing device. In another aspect, the fragment extractor 120 and categorizer 140 are spread out on different computing devices. For example, the fragment extractor 120 may be situated on a computing device of a user, such as a computer, mobile device, etc., while the categorizer 140 may be situated on a remote computing device, such as a server.

The fragment extractor 120 is designed to extract data fragments. In particular, the fragment extractor 120 is able to extract data fragments from a file 110. The file 110 may be any given file on a computer device, such as one downloaded from a network or from a portable information medium. In one aspect, the file 110 is a file whose affiliation with one of the file categories is not known.

In one aspect, the file 110 is an executable file.

In yet another aspect, the file 110 is a file or part of a file (more accurately, a file image) which is loaded into a Random Access Memory (RAM) of the computing device.

The fragment extractor 120 is able to extract data fragments 105 from the file 110. Furthermore, in order to extract the data fragments, the fragment extractor 120 makes use of extraction rules (for example, all together or only selected ones) which are kept in a database 130. In one aspect, the extraction rules comprise at least one of:

a rule based on a size of the data fragment being a same size as a byte sequence of a fixed length (e.g., 16 bytes);
a rule based on the data fragment coming after a byte, the byte having one of the following values: 0x90, 0xCC, 0xC2, 0xC3, and the data fragment itself not starting from a byte with one of these same values; and
a rule based on the data fragment starting from a byte with a given value, e.g., a value of 0x5*, where * represents any given value, e.g., 0x55.

In yet another aspect, the fragment extractor 120 decreases the number of fragments 105 to be extracted from the file 110 in accordance with additional rules. In one aspect, the additional rules comprise at least one of:

a rule that specifies that the data fragment does not start from a byte with a value of 0xFF;
a rule that specifies that the data fragment does not contain more than 8 bytes with a same value; and
a rule that specifies that the data fragment should not have more than 8 bytes in common with an already extracted data fragment (common bytes with respect to location in a file—with identical addresses).

FIG. 3 illustrates an exemplary extracted data fragment 300 that can be presented as a sequence of instructions.

It should be noted that, even though a data fragment can be represented (interpreted) in a form of assembler instructions, the data fragment extractor 120 works in such a way that the extraction of the data fragments 105 from the executable file 110 does not require disassembly of the executable file 110. Since disassembly is a resource-hungry operation, performing the extraction without the disassembly is advantageous. The assembler instructions corresponding to the byte values used by the extraction rules are instructions with a length of one byte, and therefore there is no need for a disassembly to determine the starting point of the executable instruction in the file.

In one aspect, the data fragment 105 may also be a string. The determination of strings in a file 110 may be performed using methods ordinarily known to those skilled in the art, e.g., using an application, such as Sysinternals Strings, which is an application published by Sysinternals for managing, troubleshooting and diagnosing Windows systems and applications.

The extracted data fragments 105 of the file 110 are sent, by the fragment extractor 120, to the categorizer 140.

The categorizer 140 is designed to determine the categories of the data fragments received from the fragment extractor 120, and to detect malicious files on the basis of information about the affiliation of the data fragments of the file 110 with different categories of data fragments previously stored in a database. In order to determine the category of a data fragment 105, the categorizer 140 searches for information about the data fragment 105 in a database of data fragments 135. The database of fragments 135 contains a variety of information about data fragments—e.g., the data fragments themselves (i.e. the byte sequences), and the identifiers of the categories of data fragments associated with them (i.e. the data fragments whose information is kept in the database 135).

In one aspect, the information about a data fragment may contain, instead of the data fragment itself, a byte sequence containing substitute characters (e.g., wildcard characters). The search is considered successful if the categorizer 140 finds information in the database 135 on a data fragment, said information containing a byte sequence coinciding with the data fragment 105, wherein, during the comparing of the sequences (i.e., in the course of the search), the substitute character coincides with any byte value. For example, the sequence "0x00. 0x20", containing the substitute character ".", coincides with the sequence "0x00 0x50 0x20".

In the event of a successful search for a particular data fragment 105 in the database 135, the categorizer 140 determines the category of that data fragment as being the category indicated in the information found in the database 135.

In one aspect, when the search for the data fragment 105 is unsuccessful, the categorizer 140 determines the category of the fragment 105 as being untrusted.

In one aspect, the categorizer 140 determines, as described above, the categories of all the data fragments 105 of the file 110 sent to the categorizer 140 by the fragment extractor 120.

In one aspect, when the number of data fragments 105 of the file 110 categorized as being malicious, by the categorizer 140, does not exceed a predetermined threshold value, such as 2, then the categorizer 140 does not categorize the file 110 as being malicious.

In one aspect, when all the extracted data fragments 105 of the file 110 have been categorized, by the categorizer 140, as being trusted, then the categorizer 140 also categorizes the file 110 as being trusted.

In one aspect, when the number of data fragments 105 of the file 110 that are categorized as malicious, by the categorizer 140, reaches or exceeds a predetermined threshold value, such as 90%, then the categorizer 140 categorizes the file 110 as being malicious.

It should be noted that the threshold value may be expressed either in absolute units, such as 10 or 20, or in relative units, such as 5%.

In yet another aspect, when an overall harmfulness rating of a file 110, calculated as a sum of harmfulness ratings of all the data fragments 105 of the file 110 categorized as being malicious, exceeds an established threshold value, e.g., 80, then the categorizer 140 categorizes the file 110 as being malicious.

In yet another aspect, when the number of data fragments 105 of the file 110 that are categorized as malicious data fragments, by the categorizer 140 reaches or exceeds a predetermined threshold value, then the categorizer 140 performs additional steps in order to determine whether or not to categorize the file 110 as malicious. When the additional steps are to be performed, the categorizer 140 performs a search for rules of detection of malicious files in the database 145. During the search, the categorizer 140 searches for rules of detection of malicious files that are satisfied by the set of data fragments 105 of the file 110. In one aspect, the rule for detection of a malicious file comprises a heuristic rule containing criteria to be satisfied by a file in order for the file 110 to be categorized as being malicious. In one aspect, the heuristic rule to be satisfied for detection of a malicious file may be based on information about the file fragments 105 that are to be analyzed by the categorizer 140.

An example of such a heuristic rule for detection of malicious files might be a rule formalized as an XML, object as follows:

```
<rule>
    <fragment = <a certain data fragment No. 1>/>
    <fragment = <a certain data fragment No. 2>/>
    <fragment = <a certain data fragment No. 3>/>
    <fragment = <a certain data fragment No. 4>/>
</rule>.
```

The rule provided above calls for categorizing a file containing the data fragments "a certain data fragment No. 1", "a certain data fragment No. 2", and so forth, as malicious.

In one aspect, such a heuristic rule of detection may be formalized with the use of YARA rules[1]. Likewise, in one aspect, the detection rule may contain additional criteria, such as the hash value of the file or a portion thereof, such as MD5, file size, or other parameters which can be obtained from the header of the executable file by the categorizer 140.

[1] https://github.com/VirusTotal/yara

In yet another aspect, the detection rule may be formalized with the aid of a signature or a heuristic rule.

In one aspect, the searching for the rule of detection of the malicious file in the database of detection rules 145 comprises: searching for detection rules having all criteria met by the file 110 (especially if the file 110 contains data fragments 105 which are included in the detection rule).

In the event that a detection rule is found in the database of detection rules 145, by the categorizer 140, wherein the criteria of the detection rule are met by the data fragments 105 extracted from the file 110, the categorizer 140 categorizes the file 110 as being malicious.

In one aspect, when a file 110 is categorized as being malicious, by the categorizer 140, the categorizer 140 may place the file 110 in quarantine.

In another aspect, when a file 110 is categorized as malicious, by the categorizer 140, the file 110 may be removed from the computer system of the user. For example, the file categorized as malicious may be removed in order to protect the computing system and/or the data kept on the computing system.

It should be noted that the databases—the database of extraction rules 130, the database of fragments 135 and the database of detection rules 145—may be realized either in the form of separate databases deployed on one or more computing systems (e.g., a network of computing devices, etc.), or in a form of a single database which may reside either on a computing device of the user or on a remote server. Furthermore, the updating, making of changes, adding or removing data kept in the aforementioned databases may be done remotely, for example, by a specialist in the field of information security.

In one aspect, identifiers of categories of known data fragments (i.e. data fragments about which information is stored in the database 135) that are stored in the database 135 may be obtained (designated with the aid of the fragment extractor 120) during a learning stage.

In one aspect, the learning stage is designed to generate the content of the database of data fragments 135. A data fragment is assigned to the category of malicious data fragments (considered to be malicious) if it is known that is the data fragment is encountered in malicious files (i.e., at least in some malicious files). In another aspect, a data fragment is assigned to the category of malicious fragments if it is known that it is encountered only in malicious files. In one aspect, a data fragment is assigned to the category of trusted (considered to be trusted) if it is known that it is encountered only in trusted files. In one aspect, a data fragment is assigned to the category of untrusted (considered to be untrusted) if it is neither trusted nor malicious.

In one aspect, during the learning stage, a database of learning files is used, each file being assigned either to the category of trusted or malicious. With the aid of extraction rules, such as those kept in the database of extraction rules 130, the data fragment extractor 120 extracts fragments from each file from the database of learning files. The categorizer 140 then designates the category for the extracted data fragments (assigns the data fragment to a certain category) as follows: if the data fragment is encountered (is present) only in trusted files, then the data fragment is assigned to the trusted category; if the data fragment is encountered only in malicious files, then the data fragment is assigned to the malicious category. In other cases, the data fragment may be assigned by the categorizer 140 to the untrusted category.

In one aspect, a harmfulness rating is designated for data fragments assigned to the malicious category.

In one aspect, the harmfulness rating may be provided as a number of malicious files from the database of learning files in which the malicious data fragment is encountered.

Figure 2:
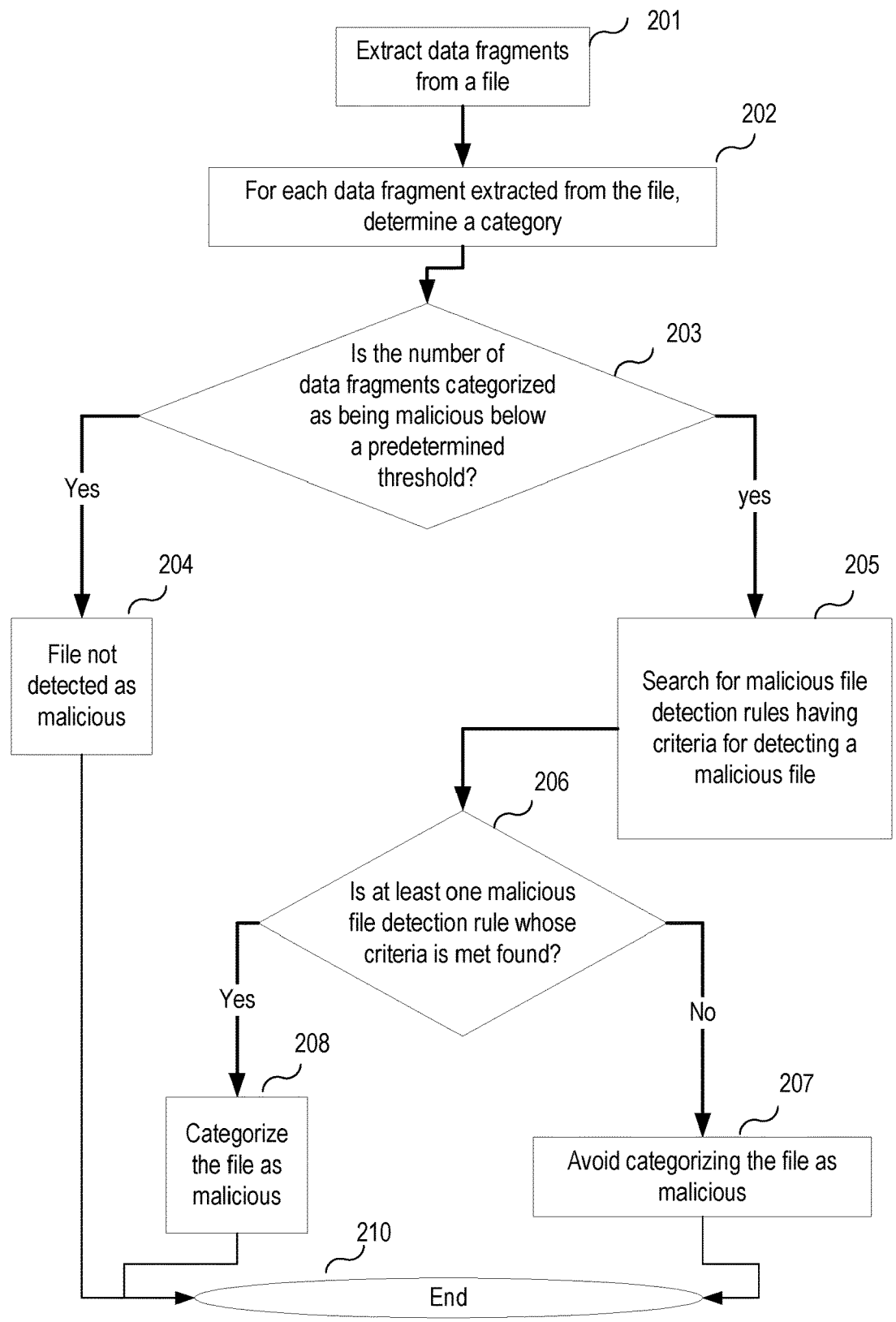
FIG. 2 illustrates a method for detecting malicious files based on file fragments in accordance with aspect of the present disclosure.

FIG. 2 illustrates a method 200 for detecting malicious files based on file data fragments in accordance with aspect of the present disclosure. The method 200 may be implemented on a computing system that comprises any number of devices, e.g., a computing system 100 that includes the fragment extractor 120 and the categorizer 140.

In step 201, method 200, by the data fragment extractor 120, extracts data fragments 105 from the file 110. Then, the data fragment extractor 120 sends all of the extracted data fragments to the categorizer 140.

In one aspect, the extraction of the data fragments is performed using rules, e.g., rules stored in a database 130. In one aspect, when the file 110 is an executable file, the process of extracting the data fragments 105 from the file 110 does not require decompiling the executable file. The extracted data fragments 105 are then sent, by the extractor 120, to the categorizer 140.

In step 202, for each data fragment 105 of the file 110 received from the fragment extractor 120, method 200, by the categorizer 140, determines a category from a list of predetermined categories that includes at least: trusted, malicious and untrusted. In other words, a data fragment may belong to one of the categories: trusted, malicious, and untrusted.

In one aspect, for each data fragment 105, the categorizer 140 determines the category of the data fragment using a database of data fragments, e.g., by searching in a database 135. The database comprises at least one of: a list of data fragments, identifiers of categories of the data fragments included in the list of data fragments, byte sequences containing substitute characters, wherein a given byte sequence coincides with a data fragment, when during a comparison of the data fragment with the given byte sequence, the substitute character coincides with any value. In one aspect, when the search in the database 135 is unsuccessful, the category of the data fragment is determined as being untrusted. In contrast, when the search is successful, the category may be malicious or trusted, based on the content of the identifier of the category.

In step 203, method 200 determines whether or not the number of data fragments categorized as being malicious is below a predetermined threshold. When the number of data fragments categorized as malicious is below a predetermined threshold, the method proceeds to step 204. When the number of data fragments categorized as malicious reaches or exceeds the predetermined threshold, the method proceeds to step 205.

In step 204, when a number of data fragments 105 of the file 110 categorized as malicious is below the threshold value, method 200, by the categorizer 140, avoids categorizing the file as malicious. The method then proceeds to step 210 to end the process.

In one aspect, when all of the data fragments 105 of the file 110 are categorized as being trusted, the method categorizes the file as being a trusted file.

In step 205, when the number of data fragments 105 of the file 110 categorized as malicious reaches or exceeds the threshold value, method 200, the categorizer 140 searches for malicious file detection rules having criteria for detecting a malicious file. For example, the categorizer 140, may search in a database of malicious file detection rules 145 for a malicious file detection rule having all of its criteria satisfied for detecting a file as being a malicious file.

In step 206, when at least one malicious file detection rule whose criteria is met is found, e.g., in the database of malicious file detection rules 145, the categorizer 140 proceeds to step 208 to categorize the file 110 as a malicious file and proceed to step 210 to end the process. When a detection rule whose criteria is met is not found, the method proceeds to step 207.

In one aspect, the at least one malicious file detection rule includes: a malicious file detection rule for detecting the file as being malicious when the number of data fragments of the file categorized as being malicious reaches or exceeds a predetermined threshold value. In one aspect, the predetermined threshold may be set as a percentage of the data fragments of the file being malicious. In another aspect, the predetermined threshold may be expressed as an absolute count of the number of data fragments of the file that are categorized as being malicious.

In one aspect, the at least one malicious file detection rule includes: a malicious file detection rule based on a harmfulness rating of the file. In one aspect, the file is categorized as malicious when the harmfulness rating of the file reaches or exceeds a predetermined threshold of harmfulness. In one aspect, the harmfulness rating of the file is computed as a sum of harmfulness ratings of all data fragments of the file that are categorized as being malicious. Therefore, in one aspect, the file is detected as being malicious when the sum of harmfulness ratings of the data fragments categorized as being malicious exceeds the predetermined threshold of harmfulness. For instance, the predetermined threshold of harmfulness may be set as 80. Then, when the sum of harmfulness of all of the data fragments of the file recognized as being malicious reaches or exceeds 80, the file is categorized as being malicious.

In one aspect, the at least one malicious file detection rule includes: a rule for performing additional steps prior to categorizing the file as being malicious. The additional rules may include determining whether or not certain heuristic rules are satisfied. In one aspect, the determination of whether or not the heuristic rules are satisfied may comprise analyzing information about the file fragments.

In step 207, method 200, by the categorizer 140, avoids categorizing the file 110 as a malicious file and proceeds to step 210 to end the process.

When detecting malicious files using the method 200, there is no need for decompiling instructions of the file. Therefore, the file can be categorized more quickly (as malicious, trusted, etc.). Moreover, the categorization is performed while using less computational resources. Thus, the detection of malicious files is faster—thereby enabling efficient steps to be taken to protect the computing system.

Figure 4:
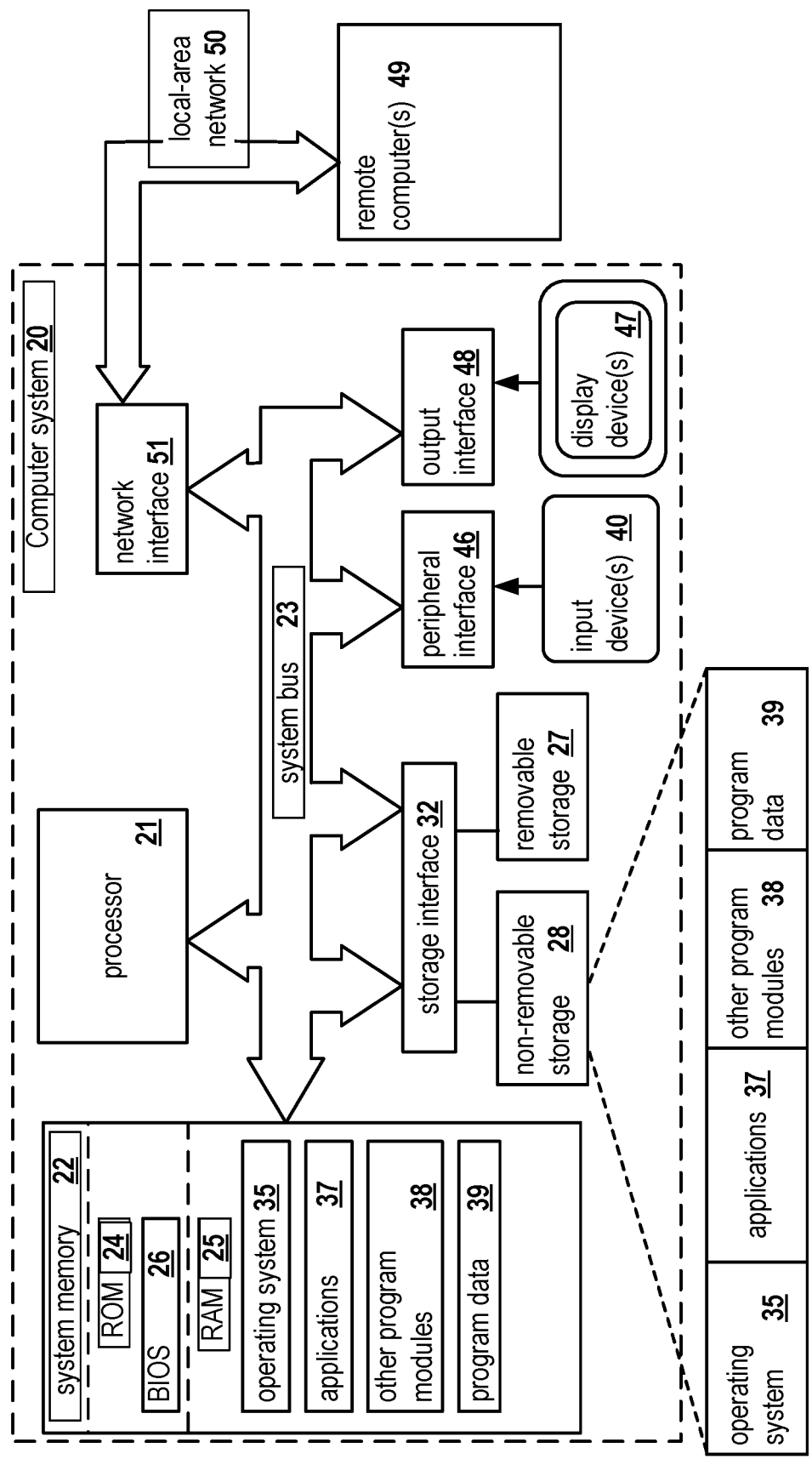
FIG. 4 presents an example of a general purpose computer system on which aspects of the present disclosure can be implemented.

FIG. 4 is a block diagram illustrating a computer system 20 on which aspects of systems and methods for detecting malicious files based on file fragments, may be implemented in accordance with exemplary aspects. It should be noted that the computer system 20 can correspond to a virtual security device 102, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malicious files based on data fragments, the method comprising:
    extracting data fragments from a file;
    categorizing each extracted data fragment as trusted, malicious, or untrusted, wherein a category of the data fragment is determined by searching in a database of data fragments, the database comprising at least one of: a list of data fragments, identifiers of categories of the data fragments, and byte sequences containing substitute characters, wherein a given byte sequence coincides with the data fragment, when during a comparison of the data fragment with the given byte sequence, the substitute character coincides with any value, wherein each byte sequence in the database of data fragments is labeled by an identifier of the data fragment category and wherein, when the search in the database is unsuccessful, the data fragment is categorized as untrusted, and when the search is successful, the data fragment is categorized as either malicious or trusted based on a content of an identifier of the category of the data fragment included in the database; and
    when a number of data fragments of the file categorized as being malicious reaches or exceeds the predetermined threshold,
        identifying at least one malicious file detection rule having criteria for detecting a malicious file based on a harmfulness rating of the file, wherein the harmfulness rating comprises a number of malicious files from the database in which the data fragment categorized as malicious is encountered;
        when at least one malicious file detection rule whose criteria is met is identified, categorizing the file as a malicious file.

2. The method of claim 1, further comprising:
    when all of the data fragments of the file are categorized as being trusted, categorizing the file as being a trusted file.

3. The method of claim 1, wherein the at least one malicious file detection rule includes: a malicious file detection rule for detecting the file as being malicious when the number of data fragments of the file categorized as being malicious reaches or exceeds the predetermined threshold, the predetermined threshold being expressed either as a percentage of the data fragments of the file being detected as being malicious or as a number of data fragments of the file being detected as malicious.

4. The method of claim 1, wherein the file is categorized as malicious when the harmfulness rating of the file reaches or exceeds a predetermined threshold of harmfulness, the harmfulness rating of the file being computed as a sum of harmfulness ratings of all data fragments of the file that are categorized as being malicious.

5. A system for detecting malicious files based on file fragments, comprising:
    at least one processor configured to:
        extract data fragments from a file;
        categorize each extracted data fragment as trusted, malicious or untrusted, wherein a category of the data fragment is determined by searching in a database of data fragments, the database comprising at least one of: a list of data fragments, identifiers of categories of the data fragments, and byte sequences containing substitute characters, wherein a given byte sequence coincides with the data fragment, when during a comparison of the data fragment with the given byte sequence, the substitute character coincides with any value, wherein each byte sequence in the database of data fragments is labeled by an identifier of the data fragment category and wherein, when the search in the database is unsuccessful, the data fragment is categorized as untrusted, and when the search is successful, the data fragment is categorized as either malicious or trusted based on a content of an identifier of the category of the data fragment included in the database;
        when a number of data fragments of the file categorized as being malicious reaches or exceeds the predetermined threshold,
            identify at least one malicious file detection rule having criteria for detecting a malicious file based on a harmfulness rating of the file, wherein the harmfulness rating comprises a number of malicious files from the database in which the data fragment categorized as malicious is encountered;
            when at least one malicious file detection rule whose criteria is met is identified, categorize the file as a malicious file.

6. The system of claim 5, the processor further configured to:
    when all of the data fragments of the file are categorized as being trusted, categorize the file as being a trusted file.

7. The system of claim 5, wherein the at least one malicious file detection rule includes: a malicious file detection rule for detecting the file as being malicious when the number of data fragments of the file categorized as being malicious reaches or exceeds the predetermined threshold, the predetermined threshold being expressed either as a percentage of the data fragments of the file being detected as being malicious or as a number of data fragments of the file being detected as malicious.

8. The system of claim 5, wherein the file is categorized as malicious when the harmfulness rating of the file reaches or exceeds a predetermined threshold of harmfulness, the harmfulness rating of the file being computed as a sum of harmfulness ratings of all data fragments of the file that are categorized as being malicious.

9. A non-transitory computer readable medium storing thereon computer executable instructions for detecting malicious files based on file fragments, including instructions for:
 extracting data fragments from a file;
 categorizing each extracted data fragment as trusted, malicious, or untrusted, wherein a category of the data fragment is determined by searching in a database of data fragments, the database comprising at least one of: a list of data fragments, identifiers of categories of the data fragments, and byte sequences containing substitute characters, wherein a given byte sequence coincides with the data fragment, when during a comparison of the data fragment with the given byte sequence, the substitute character coincides with any value, wherein each byte sequence in the database of data fragments is labeled by an identifier of the data fragment category and wherein, when the search in the database is unsuccessful, the data fragment is categorized as untrusted, and when the search is successful, the data fragment is categorized as either malicious or trusted based on a content of an identifier of the category of the data fragment included in the database;
 when a number of data fragments of the file categorized as being malicious reaches or exceeds the predetermined threshold,
  identifying at least one malicious file detection rule having criteria for detecting a malicious file based on a harmfulness rating of the file, wherein the harmfulness rating comprises a number of malicious files from the database in which the data fragment categorized as malicious is encountered;
 when at least one malicious file detection rule whose criteria is met is identified, categorizing the file as a malicious file.

10. The non-transitory computer readable medium of claim 9, the instructions further comprising instructions for:
 when all of the data fragments of the file are categorized as being trusted, categorizing the file as being a trusted file.

11. The non-transitory computer readable medium of claim 9, wherein the at least one malicious file detection rule includes: a malicious file detection rule for detecting the file as being malicious when the number of data fragments of the file categorized as being malicious reaches or exceeds the predetermined threshold, the predetermined threshold being expressed either as a percentage of the data fragments of the file being detected as being malicious or as a number of data fragments of the file being detected as malicious.

12. The non-transitory computer readable medium of claim 9, wherein the file is categorized as malicious when the harmfulness rating of the file reaches or exceeds a predetermined threshold of harmfulness, the harmfulness rating of the file being computed as a sum of harmfulness ratings of all data fragments of the file that are categorized as being malicious.

* * * * *